(12) United States Patent
Toulch

(10) Patent No.: US 7,029,115 B2
(45) Date of Patent: Apr. 18, 2006

(54) RIMLESS EYEGLASSES

(76) Inventor: Michael Toulch, 5565 Randall, Cote-St-Luc Quebec (CA) H4V 2V9

(*) Notice: Subject to any disclaimer, the term of this patent is extended or adjusted under 35 U.S.C. 154(b) by 0 days.

(21) Appl. No.: 10/944,220

(22) Filed: Sep. 20, 2004

(65) Prior Publication Data

US 2005/0206837 A1    Sep. 22, 2005

Related U.S. Application Data

(60) Provisional application No. 60/554,365, filed on Mar. 19, 2004.

(51) Int. Cl.
    *G02C 5/22* (2006.01)
(52) U.S. Cl. .................. 351/153; 351/110; 16/228
(58) Field of Classification Search ............. 351/110, 351/133, 140, 153; 16/228
    See application file for complete search history.

(56) References Cited

U.S. PATENT DOCUMENTS

| 4,304,469 A | 12/1981 | Solomon |
| 4,832,478 A * | 5/1989 | Salce ................. 351/121 |
| 5,007,728 A | 4/1991 | Magorien |
| 5,315,328 A | 5/1994 | Hofmair et al. |
| 5,321,442 A | 6/1994 | Albanese |
| 5,583,587 A | 12/1996 | Hasegawa |
| 5,642,177 A | 6/1997 | Nishioka |
| 5,790,230 A | 8/1998 | Sved |
| 6,196,679 B1 | 3/2001 | Wong |
| 6,341,864 B1 | 1/2002 | Ng |
| 6,474,810 B1 | 11/2002 | Ng |
| 6,601,953 B1 | 8/2003 | Xiao |
| 6,786,594 B1 * | 9/2004 | Lucas et al. ........ 351/153 |

* cited by examiner

*Primary Examiner*—Huy Mai

(57) ABSTRACT

Eyeglasses including a lens, a connector and a bow. The connector is connected to the lens and includes an attachment section extending substantially outwardly from the lens. The bow includes a main segment defining a longitudinal axis and an auxiliary segment defining an auxiliary axis, the auxiliary axis extending generally inwardly towards the lens. The auxiliary segment releasably interlocks and engages the attachment section upon the relative motion of the bow upon an insertion axis, the insertion axis being angled at 45° or less with respect to the longitudinal axis.

54 Claims, 8 Drawing Sheets

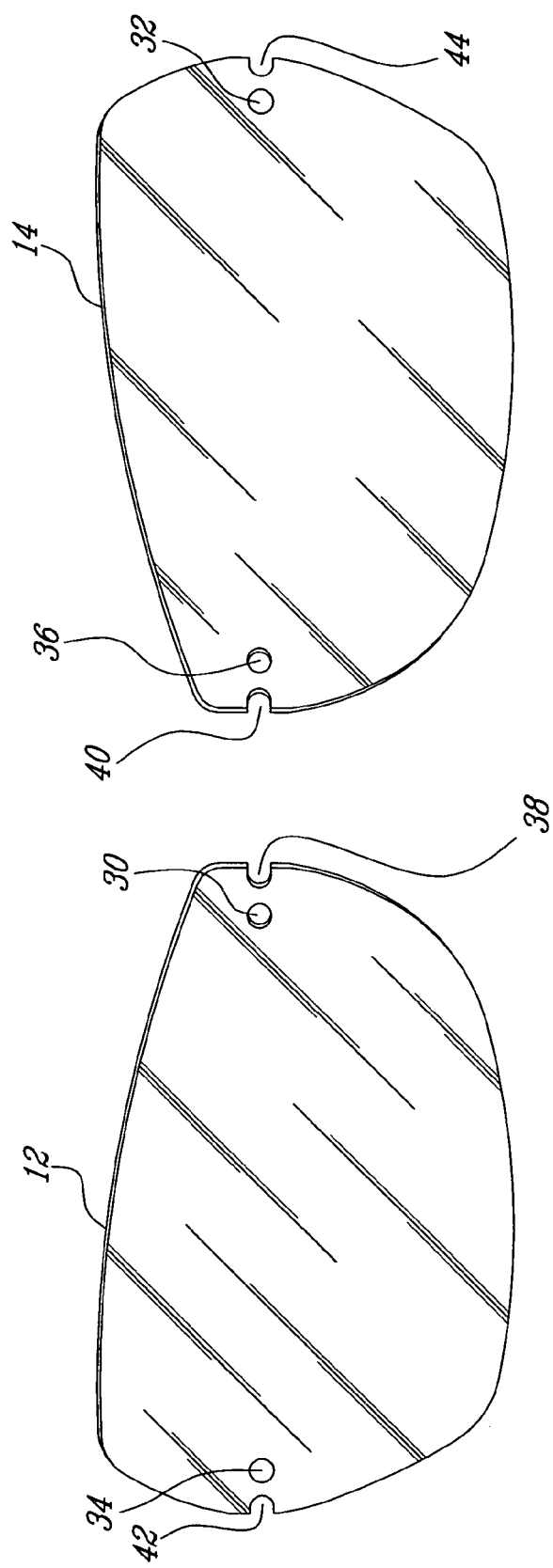

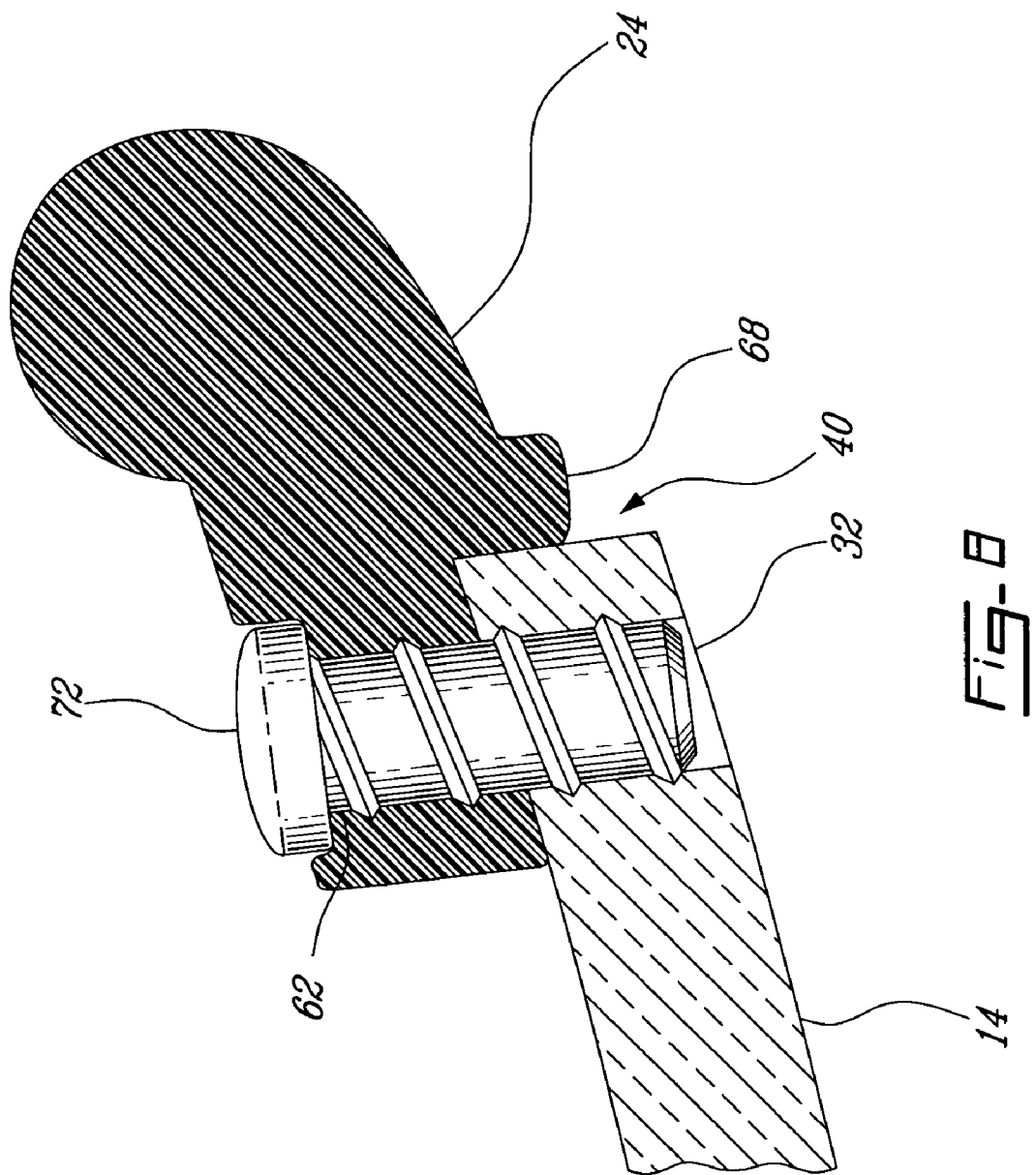

RIMLESS EYEGLASSES

This application claims priority from U.S. Provisional Patent Application Ser. No. 60/554,365 filed Mar. 19, 2004.

FIELD OF THE INVENTION

The present invention relates to eyeglasses. More specifically, the present invention is concerned with rimless eyeglasses.

BACKGROUND OF THE INVENTION

Rimless eyeglasses typically include two lenses, a bridge connecting the two lenses and two bows. The bows are attached to the lenses such that a portion of each bow covers a small portion of the front surface of each lens. Often, the bridge also covers a small portion of the front surface of the lenses. Since an objective of rimless eyeglasses is to eliminate as much as possible any part surrounding the lenses, the portions of the bridge and bows protruding on the front of the lenses are undesirable.

Eyeglasses with detachable bows also exist in the art. Typically, the bows are attached to a rim of the eyeglasses through indentations, or cavities, provided within the bows that engage pins protruding from the frame of the eyeglasses. The eyeglasses and bows are often configured such that the bow cannot be rotated past a certain point on a hinge formed by the pins and the indentations. To that effect, part of the bow abuts the frame when the bow is in a fully opened configuration. Since rimless eyeglasses do not have a frame, detachable bows are typically not provided in rimless eyeglasses.

Another problem with eyeglasses including detachable bows, is a tendency for the bows to be relatively easily detached from the eyeglasses. This is highly undesirable as a bow that easily detaches from the rest of the eyeglasses could cause the eyeglasses to fall off of the user when worn, which could cause damage to the lens or any other parts of the eyeglasses.

To satisfy other constraints, detachable bows typically attach to the eyeglasses in a movement oriented substantially towards the lens. An example of such a detachable bow can be found in U.S. Pat. No. 5,315,328 issued May 24, 1994 to Silouette International Gesellschaft m.b.H. The reader skilled in the art will readily appreciate that if a torsion is exerted around a longitudinal axis of the bow in this patent, the bow will easily become detached from the lens.

In addition, if the user is hit in the face by an object while these glasses are worn, the bows by this construction stay attached to the eyeglasses. Therefore, the eyeglass can easily become damaged by such external constraints.

Furthermore, eyeglasses are often very expensive, therefore users usually only buy a single pair. It could be desirable in some situations to have a pair of eyeglasses that could be decorated in a plurality of ways.

Against this background, there exists a need in the industry to provide novel rimless eyeglasses.

OBJECTS OF THE INVENTION

An object of the present invention is therefore to provide improved rimless eyeglasses.

SUMMARY OF THE INVENTION

In a first broad aspect, the invention provides eyeglasses including a lens, a connector and a bow. The connector is connected to the lens and includes an attachment section extending substantially outwardly from the lens. The bow includes a main segment defining a longitudinal axis and an auxiliary segment defining an auxiliary axis, the auxiliary axis extending generally inwardly towards the lens. The auxiliary segment releasably interlocks and engages the attachment section upon the relative motion of the bow upon an insertion axis, the insertion axis being angled at 45° or less with respect to the longitudinal axis.

In a specific example of implementation, the bow is relatively easily detachable from the connector by moving the bow in a direction substantially parallel to a longitudinal axis of the bow. However, the bow is not relatively easily detachable from the connection through motions in other directions or through torsions.

In an embodiment of the invention, the eyeglasses include a nosepiece attaching the lens to another lens. The nosepiece includes a detachable bridge portion.

Advantageously, the detachable bridge portion and the detachable bows allow changing the aesthetic aspect of the eyeglasses without requiring a totally different pair of eyeglasses.

Also, the bow is relatively easily attached to and detached from the connector while being hard to detach when the eyeglasses are worn by a user. Notably, opening two bows of the eyeglasses away from each other or applying torsion around a longitudinal axis of the bows does not relatively easily detach the bows from the connectors.

Another advantage resides in the motion required for detaching the bow from the connector, which allows the bow to be detached from the connector in the case of an impact on the eyeglasses when worn.

Yet another advantage of the eyeglasses resides in an improved aesthetic aspect caused by a reduction of an amount of material visible when the eyeglasses are worn.

In a second broad aspect, the invention provides an eyeglass including a lens and a connecting means connected to the lens. The connecting means includes an attachment means extending substantially outwardly from the lens. The eyeglass further includes a bow reversibly attached to the connecting means. The bow includes a main segment means defining a longitudinal axis and an auxiliary segment means defining an auxiliary axis extending generally inwardly towards the lens, the auxiliary segment means releasably interlocking and engaging the attachment means upon a relative motion of the bow along an insertion axis. The insertion axis is angled at 45 degrees or less with respect to the longitudinal axis.

In a third broad aspect, the invention provides an eyeglass including a lens and a connector connected to the lens. A bow is reversibly attached to the connector, the bow defining a longitudinal axis. A minimal perpendicular force required to detach the bow from the connector and exerted perpendicularly to the longitudinal axis is greater than a minimal parallel force required to detach the bow from said connector and exerted parallel to the longitudinal axis.

Other objects, advantages and features of the present invention will become more apparent upon reading of the following non-restrictive description of preferred embodiments thereof, given by way of example only with reference to the accompanying drawings.

BRIEF DESCRIPTION OF THE DRAWINGS

In the appended drawings:

FIG. 7 is an elevation view of the lenses of FIG. 1; and

FIG. 8 is a cross-section illustrating an attachment of the connector of FIG. 3 to a lens of FIG. 7 through a screw.

DETAILED DESCRIPTION

Figure 1:
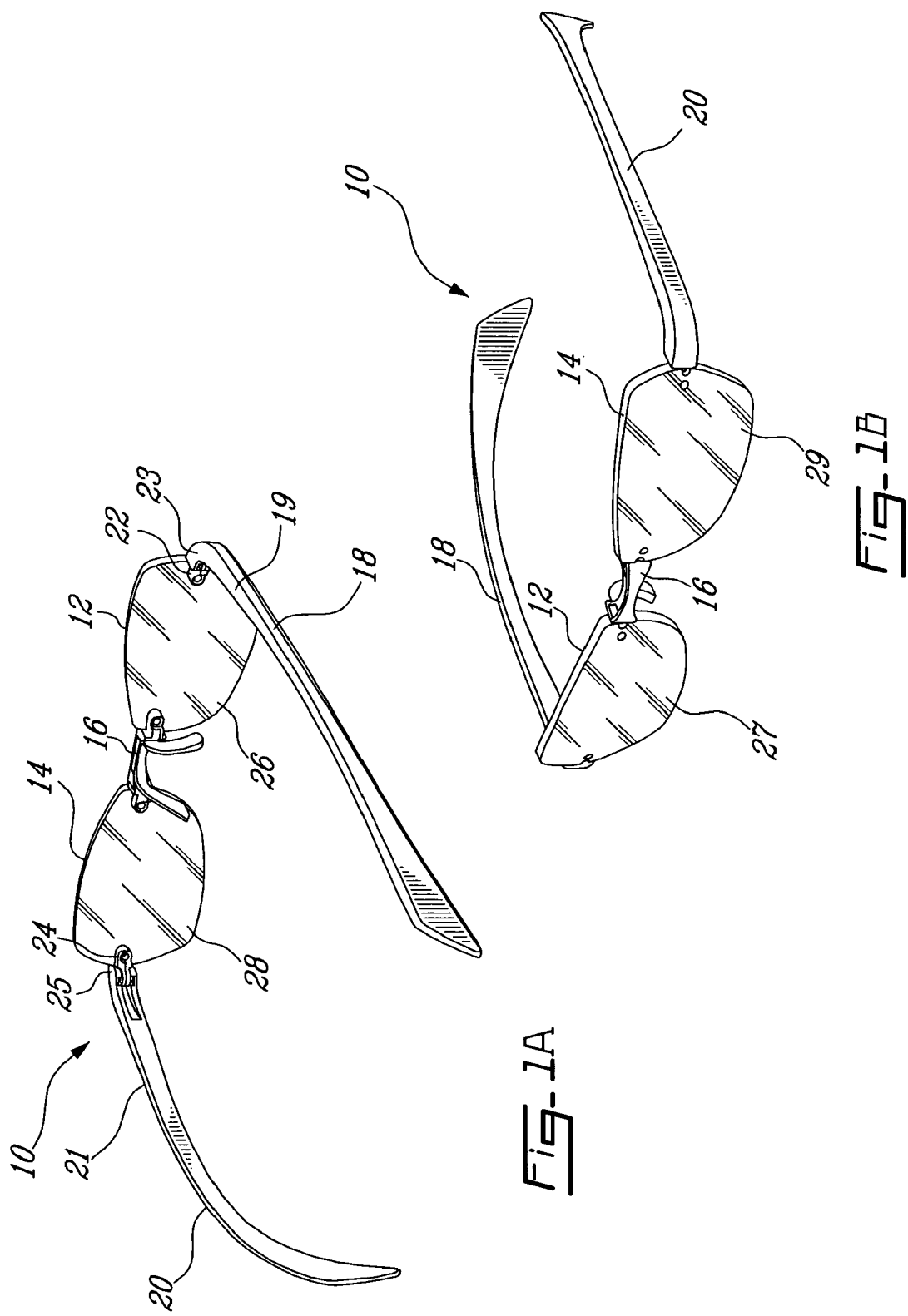
FIG. 1A is a perspective view of a pair of eyeglasses including a nosepiece, lenses, connectors and bows.
FIG. 1B is an alternative perspective view of the pair of eyeglasses of FIG. 1A.

FIGS. 1A and 1B illustrate eyeglasses 10. Although the eyeglasses 10 are rimless eyeglasses, the reader skilled in the art will readily appreciate that many features described hereinbelow are also applicable to eyeglasses that include rims. Accordingly, eyeglasses with rims are also within the scope of the invention.

The eyeglasses 10 include two lenses 12 and 14, which are non-essentially substantially mirror images of each other, connected by a nosepiece 16 and defining respectively front surfaces 27 and 29 and back surfaces 26 and 28. Two connectors 22 and 24 are connected respectively to the lenses 12 and 14. Two bows 18 and 20 are reversibly attached respectively to the connectors 22 and 24.

The bows are configured and sized such that each bow 18 and 20 interlocks and engages a respective connector 22 and 24 upon a relative motion of the bow 18 and 20 along an insertion axis, the insertion axis being angled at 45° or less with respect to a longitudinal axis of the bows 18 and 20.

Broadly speaking, the back surfaces 26 and 28 point substantially towards the head of an intended user when the glasses 10 are worn. The front surfaces 27 and 29 are opposed to the back surfaces 26 and 28 and point substantially away from the user when the glasses are worn.

In other words, the front surface 27 and 29 is the surface of the lens 12 and 14 that receives incoming light that is transmitted into the lenses 12 and 14 towards the back surface 26 and 28 and thereafter towards the eye of the user.

In specific embodiments of the invention, the lenses 12 and 14 are prescription lenses, decorative transparent lenses, or dark lenses made of a polymer such as polycarbonate, Nylon™ or any suitable lens material. However, the reader skilled in the art will appreciate that the lenses 12 and 14 can be any other suitable lenses.

To provide a pleasant, esthetic aspect, in some embodiments of the invention, the connectors 22 and 24 are positioned configured and sized such that no part of the connectors 22 and 24 directly contacts the front surface 27 and 29 of the lenses 12 and 14.

Figure 3:
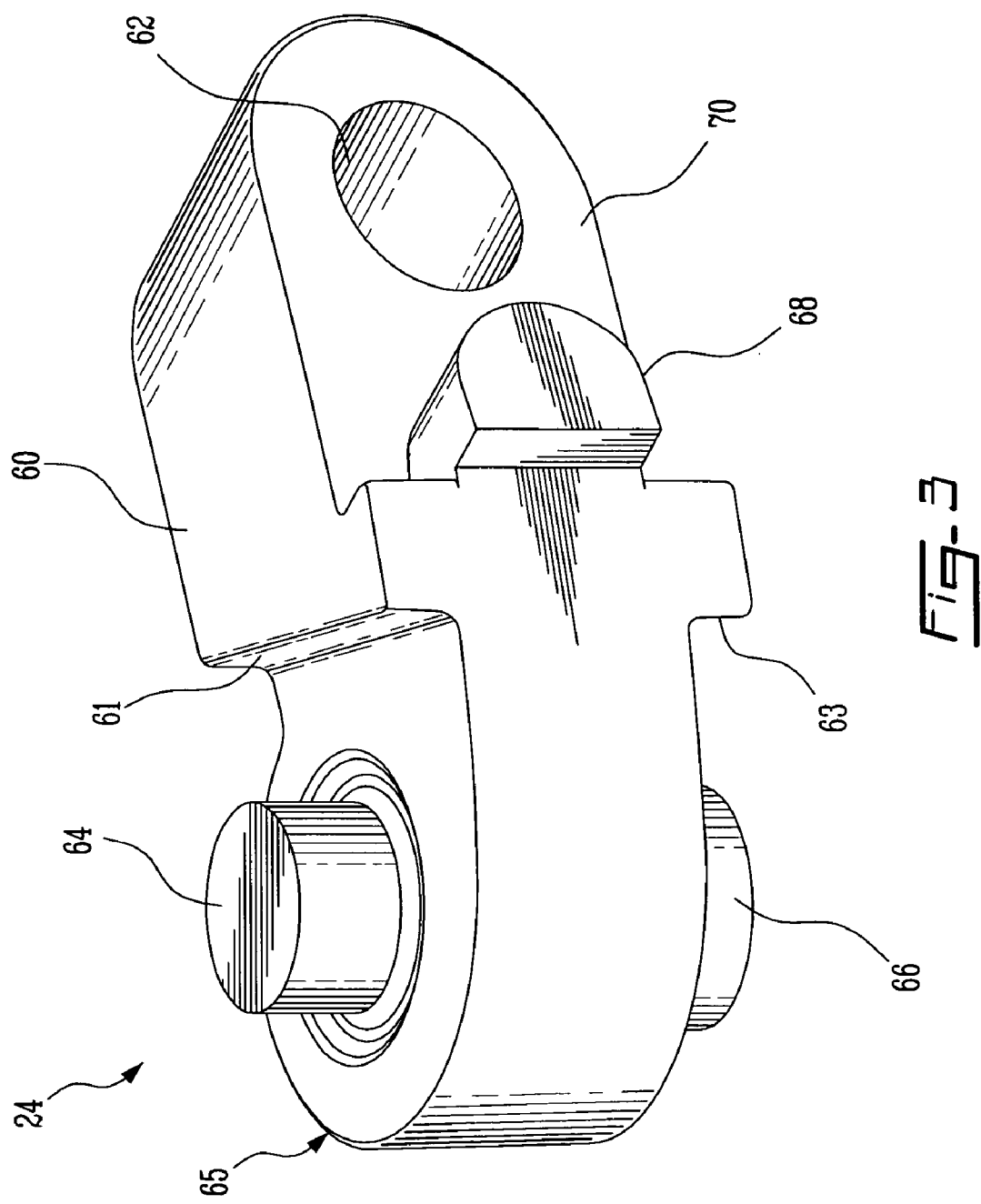
FIG. 3 is a perspective view of the connector of FIG. 1A.

As shown in FIG. 3, each of the connectors 22 and 24 includes an attachment section 65 extending substantially outwardly from a respective lens 12 and 14. Turning back to FIG. 1A, each of the bows 18 and 20 includes a respective main segment 19 and 21 defining the longitudinal axis. In addition, each of the bows 18 and 20 includes an auxiliary segment 23 and 25 defining an auxiliary axis extending substantially inwardly towards a respective lens 12 and 14.

Each auxiliary segment 23 and 25 releasably interlocks and engages the attachment segment 65 upon a relative motion of the bows 18 and 20 along an insertion axis. The insertion axis, as mentioned hereinabove, is angled at 45° or less with respect to the longitudinal axis. The direction of the motion through which the bow 20 is attached to the connector 24 is illustrated by the arrow 71.

In other words, an eyeglass includes a lens and a connecting means connected to the lens. The connecting means includes an attachment means extending substantially outwardly from the lens. The eyeglass further includes a bow reversibly attached to the connecting means. The bow includes a main segment means defining a longitudinal axis and an auxiliary segment means defining an auxiliary axis extending generally inwardly towards the lens, the auxiliary segment means releasably interlocking and engaging the attachment means upon a relative motion of the bow along an insertion axis. The insertion axis is angled at 45 degrees or less with respect to the longitudinal axis.

In yet other words, an eyeglass includes a lens and a connector connected to the lens. A bow is reversibly attached to the connector, the bow defining a longitudinal axis. A minimal perpendicular force required to detach the bow from the connector and exerted perpendicularly to the longitudinal axis is greater than a minimal parallel force required to detach the bow from said connector and exerted parallel to the longitudinal axis.

Although the eyeglasses 10 shown in FIGS. 1A and 1B include two lenses 12 and 14, the reader skilled in the art will readily appreciate that eyeglasses including a single lens are within the scope of present invention.

As shown in FIG. 1A, the insertion axis in the eyeglass 10 is angled at 30° or less with respect to the longitudinal axis. More specifically, the insertion axis is substantially parallel to the longitudinal axis. Therefore, the bows 18 and 20 are connected to their respective connectors 22 and 24 through a motion substantially parallel to the longitudinal axis of the bows.

In some embodiments of the invention, not shown in the drawings, the auxiliary segment includes a pin and the connector includes a recess for receiving the pin. The pin extends outwardly from the auxiliary segment substantially perpendicularly to the insertion axis.

In other embodiments of the invention, as shown in the drawings, each connector, for example connector 24 as shown in FIG. 3, includes a pin 64.

Figure 4:
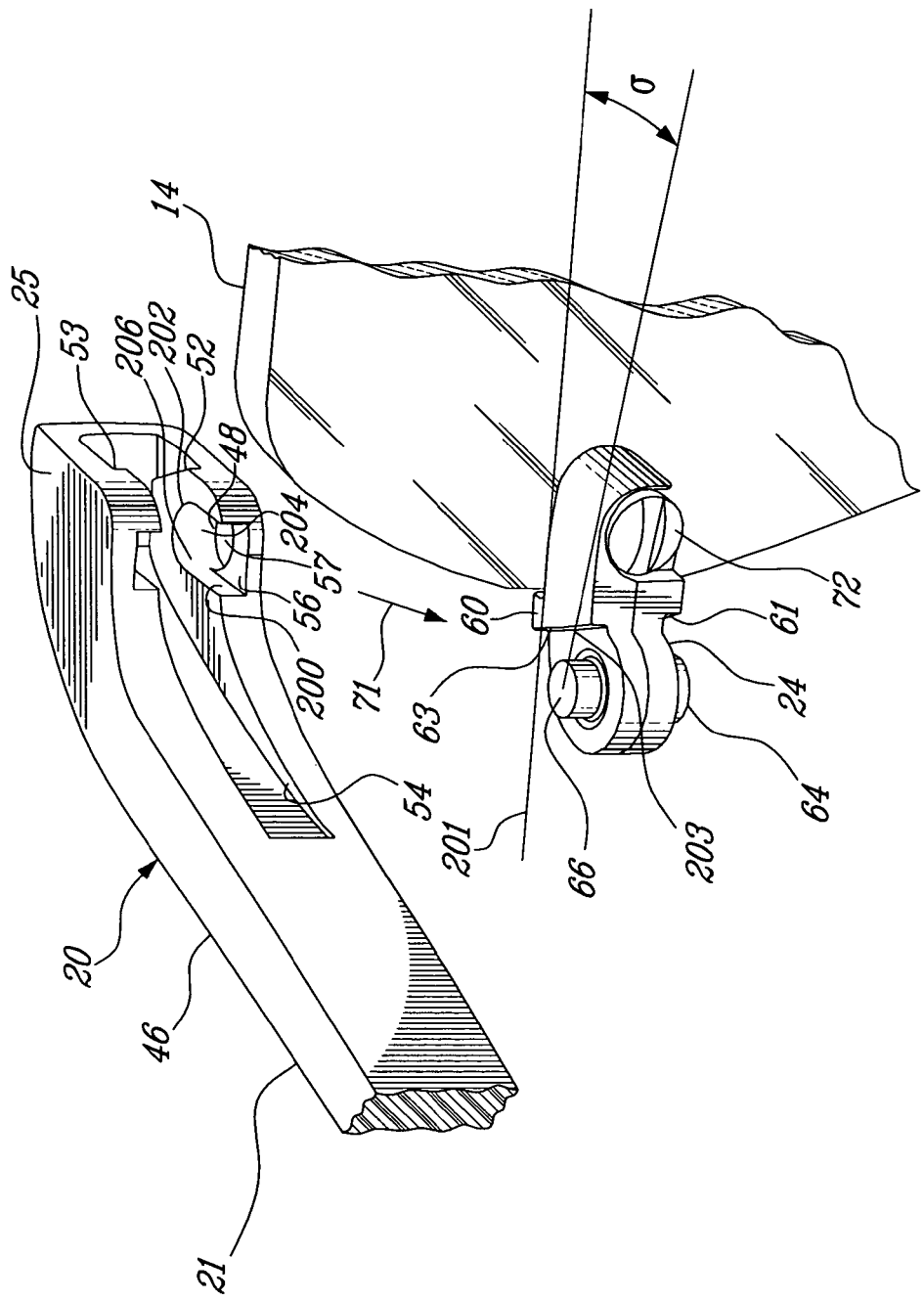
FIG. 4 illustrates an attachment of the bows of FIG. 2 to the connector of FIG. 3.

As shown in FIG. 4, each bow, for example bow 20, includes a recess 57 provided within the auxiliary segment 25 for receiving the pin 64. The recess 57 is provided within a slot 48, the slot 48 being oriented substantially parallel to the insertion axis.

The bow 18 is similar to the bow 20, except that the bow 20 is a mirror image of the bow 18, such that bows 18 and 20 are attachable on different sides of the eyeglasses 10. It is also within the scope of the invention to have eyeglasses wherein the two bows are identical.

The pin 64 adopts a first undeformed configuration when outside of the slot 48. Upon being inserted into the slot 48, the pin 64 deforms from the first configuration to a second deformed configuration. Thereafter, when received by the recess 57, the pin 64 adopts the first configuration. Therefore, since a deformation of the pin 64 is required to effect a movement of the bow 20 attaching or detaching the bow 20 from the connector 24, the bow 20 is releasably attached to the connector 24.

In alternative embodiments of the invention, the pin 64 does not adopt the first configuration when received by the recess 57. Instead, the pin 64 remains deformed when received by the recess 57.

In some embodiments of the invention, each of the connectors includes two pins and each of the bows includes two recesses. For example, as shown in FIG. 4, the connector 24 includes a second pin 66 and the bow includes a second recess, not shown in the drawings. Similarly to the recess 57, the second recess is provided within a second slot, the second slot also being oriented substantially along the insertion axis.

The pins 64 and 66, as well as the recesses, one of which being the recess 57, take any suitable form. As shown in the drawings, in a specific embodiment of the invention, the recess 57 is substantially cylindrical and the pin 64 is also substantially cylindrical. However, the reader skilled in the art will readily appreciate that the exact shape of the pins is not critical to the invention. Accordingly, in alternative embodiments of the invention, the recesses and pins have alternative shapes.

To allow the insertion of the pins within the recesses, in some embodiments of the invention, the slot 48 includes a substantially rectilinear channel 200, the channel 200 defining an opening 56 for receiving the pin 64 upon a motion of the bow 20 along the insertion axis. In addition, the slot 48 includes a substantially hemi-cylindrical extremity 202 opposed to the opening 56.

The recess 57 defines a recess interior surface 204 and the hemi-cylindrical extremity 202 defines a substantially hemi-cylindrical end surface 206. The hemi-cylindrical end surface 206 extends continuously from the recess interior surface 204. Therefore, the pin 64 abuts, in some embodiments of the invention, simultaneously the hemi-cylindrical end surface 206 and the recess interior surface 204. This distributes a force of contact between the bow 20 and the connector 24 on a relatively large surface.

Figure 2:
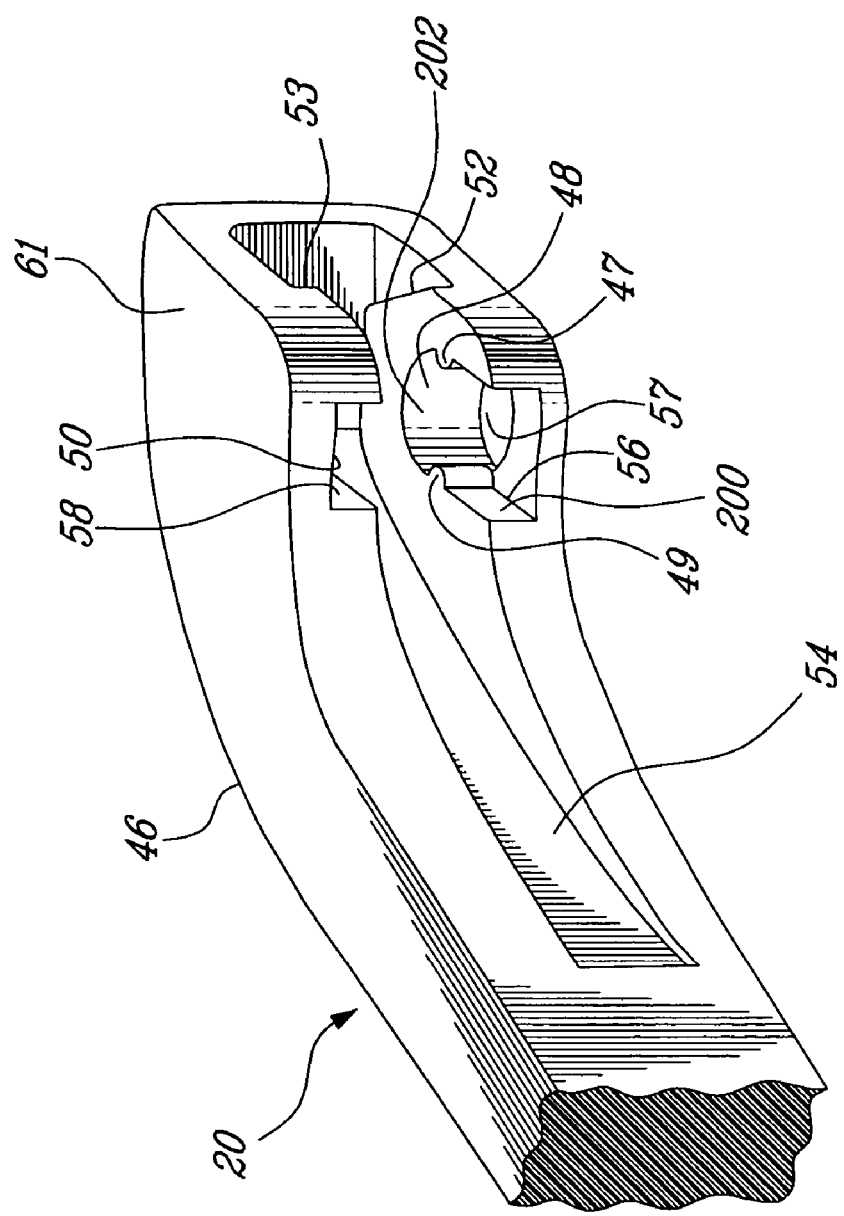
FIG. 2 is a perspective view of an extremity of the bows of FIG. 1A.

FIG. 2 shows an alternative bow 20' similar to the bow 20. FIG. 2 shows the bow 20' including the second slot 50 defining a second opening 58 for receiving the pin 66.

However, a difference between the bow 20' and the bow 20 resides in bumps 48 and 49 extending inwardly within the slot 48 between the channel 200 and the hemi cylindrical extremity 202. The bumps 48 and 49 allow the pin to snap into the extremity of the slot 48 opposed to the opening 56. Although FIG. 2 illustrates a bow 20' including two bumps 48 and 49, the reader skilled in the art will readily appreciate that it is within the scope of the invention to have bows including any suitable number of bumps.

The bow 20 further defines a cavity 54. The cavity 54 includes the slot 48 and the recess 57 and receives, in part, the connector 24. The pins 64 and 66 define a rotation axis, the rotation axis being substantially perpendicular to the insertion axis. The cavity 54 is configured and sized to allow the bow 20 to rotate onto the pins 64 and 66 about the rotation axis.

In some embodiments of the invention, as shown in the drawings, the cavity 54 defines a cavity abutment surface 52 substantially parallel to the rotation axis. The cavity abutment surface 52 defines a cavity abutment surface normal vector perpendicular to the cavity abutment surface 52. The cavity abutment surface normal vector points substantially inwardly towards the lens 14.

In addition, the connector 24 defines a connector abutment surface 61 substantially parallel to the rotation axis. The connector abutment surface 61 defines a connector abutment surface normal vector perpendicular to the connector abutment surface 61. The connector abutment surface normal vector points substantially outwardly from the lens 14.

The connector abutment surface 61 and the cavity abutment 52 contact each other upon a rotation of the bow 20 around the rotation axis when an angle between the longitudinal axis of the bow 20 and the back surface of the lens increases up to a predetermined angle.

Therefore, the abutment surfaces 61 and 52 cooperate to prevent the bow 20 from extending away from the bow 18 more than a predetermined distance. When the cavity abutment surface 52 and the connector abutment surface 61 contact each other, a rotation of the bow 20 around the rotation axis, such that the angle between the longitudinal axis of the bow 20 and the back surface of the lens increases is resisted by a contact force between the connector abutment surface 61 and the cavity abutment surface 52.

As shown in the drawings, in some embodiments of the invention, the connector abutment surface 61 and the cavity abutment surface 52 prevent the bow 20 and the lens 14 from directly contacting each other upon a rotation of the bow away from the back surface of the lens 14. To that effect, in some embodiments of the invention, the connector abutment surface 61 is provided onto the connector 24 between the lens 14 and the pin 64.

As shown on FIG. 4, in some embodiments of the invention each connector, for example connector 24, includes a second connector abutment surface 63 and each of the bows, for example bow 20, includes a second cavity abutment surface 53. The presence of two pairs of abutment surface allows the distribution of a contact force between the abutment surfaces onto a larger surface, which reduces the risks that the abutment surfaces will be damaged through the exertion of an abusive force onto the eyeglasses 10.

In some embodiments of the invention, the connector 24 is substantially symmetrical with respect to a symmetry plan. The symmetry plan is substantially perpendicular to the rotation axis. This allows the use of a single connector for both connectors 24 and 22, which improves manufacturing efficiency.

The lenses 12 and 14, and the attachment of the connectors 22 and 24 thereto will now be described in further detail with reference to FIGS. 7 and 8. The eyeglasses 10 include a fastener 72 for attaching the connector 24 to the lens 14. The fastener 72 pushes the connector 24 towards the back surface 28 of the lens 14.

To that effect, the connector 24 includes an attachment bore 62 extending therethrough. The attachment bore 62 is substantially perpendicular to the rotation axis and receives the fastener 72. Also, the lens 14 includes an attachment hole 32 provided therein for receiving the fastener 72.

In a specific embodiment of the invention shown in the drawings, the fastener takes the form of a screw 72, which can include Grilamid or any other suitable material. In that case, the attachment hole 32 is a threaded hole for threading the screw 72 into the hole 32. The hole 32 shown in the drawings extends only partially through the lens 14. However, it is within the scope of the invention to have lenses including attachment holes extending totally therethrough.

While not a necessity, in some embodiments of the invention, the attachment bore 62 is an unthreaded bore. However, it is within the scope of the invention to have attachment bores that are threaded.

The connector 24 includes a protrusion 68 and the lens 14 includes a notch 44 for receiving the protrusion 68. The notch 44 and the protrusion 68 are located, configured and sized such as to resist a rotation of the connector 24 about a bore axis substantially longitudinal to the bore 62. The notch 44 and the protrusion 68 are substantially hemi-cylindrical.

Although only the attachment of the connector 24 to the lens 14 has been described in detail, the reader skilled in the art will readily appreciate that the connector 22 similarly attaches to the lens 12. To that effect, an attachment hole 34 is provided within the lens 12, the attachment hole 24 being similar to the attachment hole 32. Also, a notch 42 is included in the lens 12.

In some embodiments of the invention, an optimal comfort of the glasses 10 is provided when the abutment surfaces, such as abutment surfaces 52 and 61 contact each other when the bows 20 and 18 are substantially perpendicular to an axis connecting the connectors 22 and 24. In this case, the bow 18 and 20 are substantially perpendicular to the eyeglasses. When the lenses 12 and 14 are appropriately dimensioned, this provides at pleasant esthetic aspect to the eyeglasses 10 while allowing the eyeglasses 10 to be comfortable to the wearer.

Since lenses directed to correct different degrees of nearsightedness and farsightedness include different curvatures of the lens in proximity to the location wherein the connectors 22 and 24 are provided, in some embodiments of the invention, it is necessary to choose between a plurality of connectors similarly shaped.

The connectors from the plurality of connectors differ in the following way illustrated on FIG. 4. A line 203 is defined such that the line 203 is substantially perpendicular to the bows 18 and 20 when the abutment surfaces, such as abutment surfaces 52 and 61, contact each other. Another line 201 is defined such that the line 201 is parallel to a surface of the connectors 22 and 24 that contacts the lenses 12 and 14. An angle σ is defined as an angle between the lines 203 and 201. The plurality of connectors differ in the value of the angle σ, which allows to adapt the connector to the curvature of the lenses 12 and 14. In a specific example of implementation, the plurality of connectors includes connectors for which σ takes 11 degrees, 17 degrees and 24 degrees. However, it is within the scope of the invention to have any number of connectors each having any suitable value of σ.

Figure 5B:
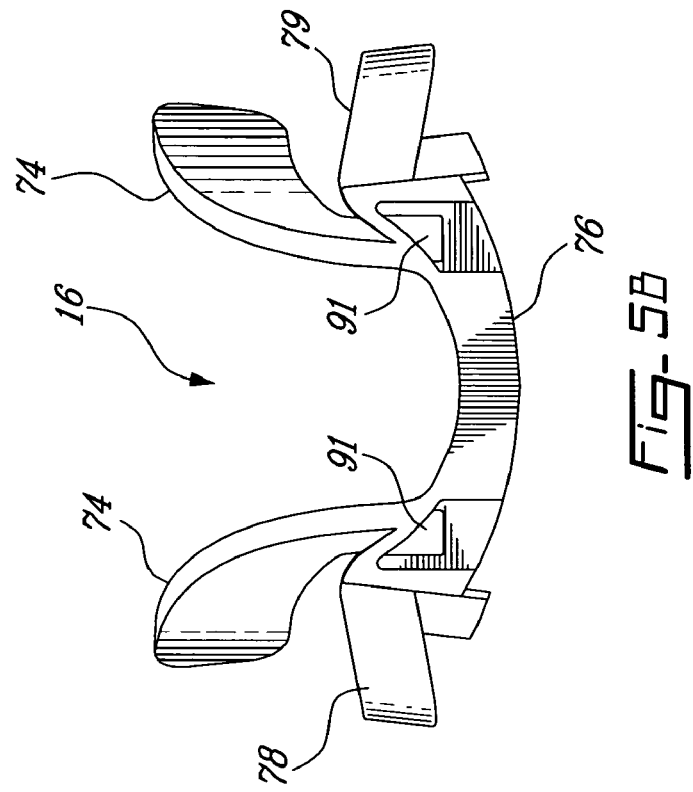
FIG. 5B is a top view of the nosepiece of FIG. 5A.
Figure 5A:
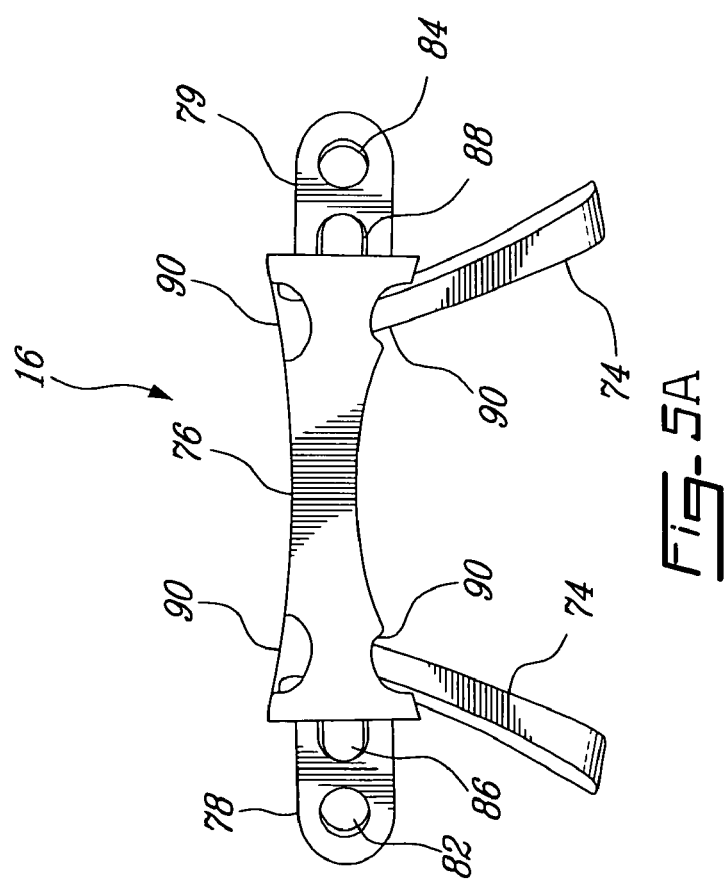
FIG. 5A is a front view of the nosepiece of FIG. 1A.

FIGS. 5A and 5B illustrate the nosepiece 16. The nosepiece 16 is positioned, configured and sized to support the eyeglass 10 onto the nose of an intended user.

The nosepiece 16 includes nose pads 74 for receiving the nose and connection portions 78 and 79 for connecting the nosepiece 16 respectively to the first and second lenses 12 and 14. In addition, the nosepiece 16 includes a bridge portion 76 connected to the connection portions 78 and 79 and to the nose pads 74.

Figure 6:
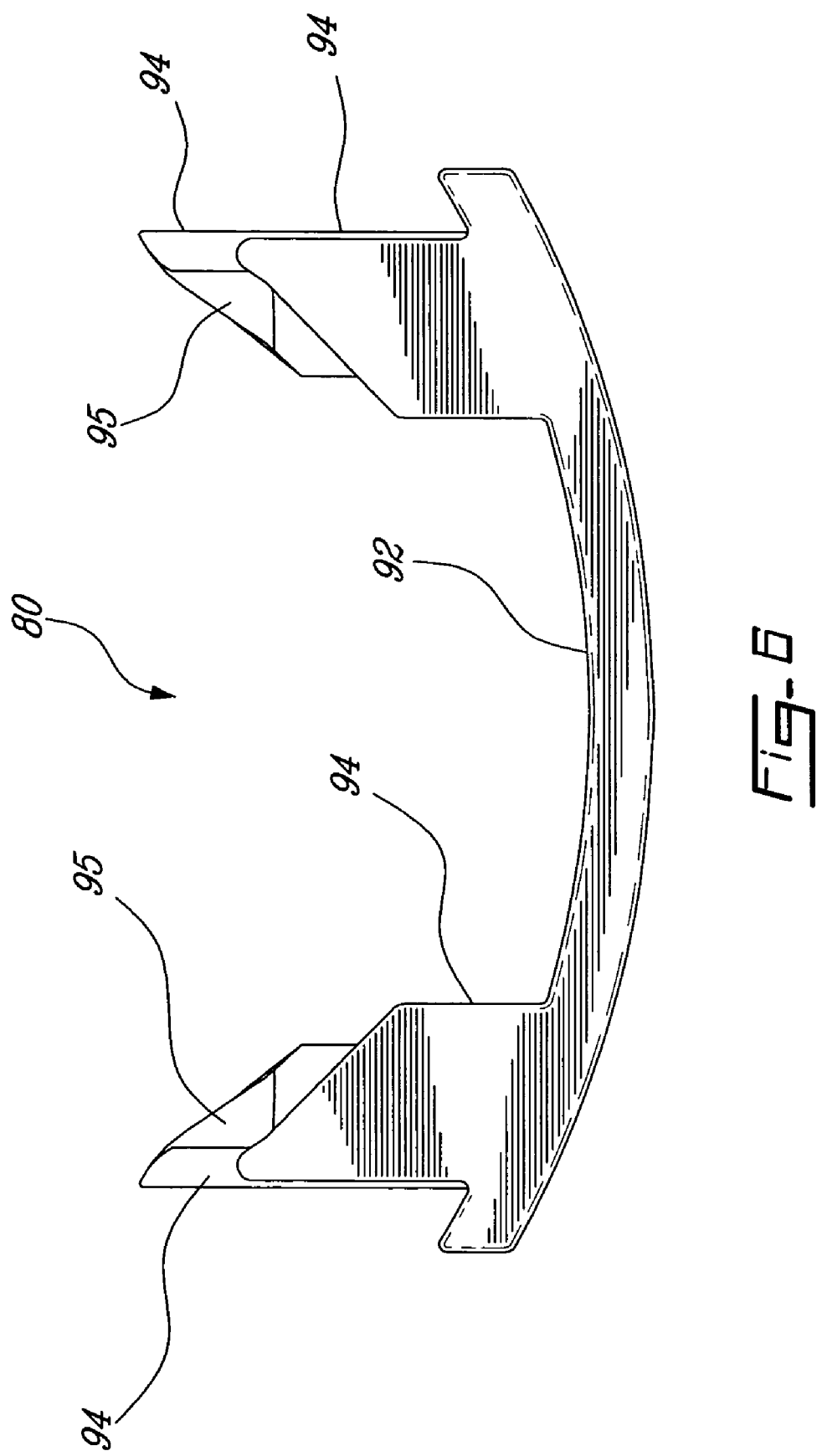
FIG. 6 is a top view of a detachable bridge cover, attachable to the nosepiece of FIG. 5.

In some embodiments of the invention, although not necessarily in all embodiments of the invention, the nosepiece 16 includes a detachable bridge cover 80, shown in FIG. 6. The detachable bridge cover 80 covers, at least in part, the bridge portion 76.

The connection portions 78 and 79 attach the nosepiece 16 to the lenses 12 and 14 similarly to the way that the connectors 22 and 24 are attached to these lenses 12 and 14. To that effect, the connection portions 78 and 79 include respective attachment bores 82 and 84 extending therethrough. The longitudinal axes of the attachment bores 82 and 84 are substantially parallel. In addition, the connection portion 78 and 79 include respective protrusions 86 and 88.

The lenses 12 and 14 respectively include attachment bores 30 and 36, and notches 38 and 40. Fasteners (not shown in the drawings) are inserted through the attachment holes 82 and 84, and into the attachment bores 30 and 36, to attach the nose piece 16 to the lenses 12 and 14.

The attachment holes 82 and 84 and attachment bores 30 and 36 just described hereinabove are similar to previously described attachment holes and attachment bores, and perform similar functions through similar structures.

In a specific embodiment of the invention, the following structures are provided to attach the detachable bridge cover 80 to the nosepiece 16. The bridge portion 76 includes grooves 90. Also, the bridge cover 80 includes latches 94 for engaging the grooves 90, thereby attaching the bridge cover 80 to the bridge portion 76. The exact number and configuration of the latches 94 and of the grooves 90 is not critical to the present invention.

In a specific embodiment of the invention, some of the grooves 90 each include a respective depression 91 extending substantially inwardly into the bridge portion 76. Corresponding extensions 95 extend substantially outwardly from the latches 94 towards the grooves 90. The extensions 95 releasably engage the depressions 91 to releasably lock the bridge cover 80 to the bridge portion 76.

In a specific embodiment of the invention, a thickness of each of the grooves 90 is substantially equal to a thickness of a respective latch 94. Therefore, the detachable bridge cover 80 attached to the bridge portion 76 produces a substantially flat surface at a location where the latches 94 engage the grooves 90.

In some embodiments of the invention, the bridge portion 76, the connection portion 78 and 79, and the nose pads 74 are substantially transparent. However, the bridge cover 80 is not substantially transparent. For example, the bridge cover 80 is colored.

Optionally, the nosepiece 16, except for bridge cover 80, and the connectors 22 and 24 have an appearance substantially equivalent to an appearance of the lenses 12 and 14. In other words, if the lenses 12 and 14 are transparent, the connectors 22 and 24 and the nosepiece 16, except for the detachable bridge cover 80, are substantially transparent. Alternatively, and optionally, if the lenses 12 and 14 are darkened, such as for use in sunglasses, the nosepiece 16 and the connectors 22 and 24 are also darkened.

Optionally, the bows 18 and 20 are also transparent. Alternatively, the bows 18 and 20 are colored. In contrast, the detachable bridge cover 80 is colored or translucent.

Therefore, by providing a plurality of detachable bridge covers 80 and a plurality of bows 18 and 20, the bows 18 and 20 and the detachable bridge covers 80 having many different colors, the aesthetic appearance of the eyeglasses 10 can easily be changed by a user without requiring a complete change of eyeglasses 10. The appearance of the eyeglasses 10 can further be changed by having bows of different shapes.

In use, in some embodiments of the invention, the lenses 12 and 14, the nosepiece 16, the connectors 22 and 24, and the bows 18 and 20 are provided as separate pieces. Then, the connectors 22 and 24 and the nosepiece 16 are semi-permanently attached to the lenses 12 and 14 through screws. The detachable bridge cover 80 and the bows 18 and 20 are easily detachable for replacement or storage by a user.

As shown on FIG. 1, when the bows 18 and 20 are in an open configuration wherein the eyeglasses are wearable by an intended user, it is highly unlikely that the bows 18 and 20 can become spontaneously separated from the eyeglasses 10 because forces encountered through normal use are typically torsions along the longitudinal axis of the bows and forces directed in a direction pushing the bows 18 and 20 away from each other. Motions of the bows 18 and 20 with respect to the lenses 12 and 14 in the direction of such forces is limited by the configuration of the different elements of the eyeglasses 10.

However, if there is an impact on the eyeglasses 10, the bows 18 and 20 relatively easily snap off the connectors 22 and 24, thereby helping to prevent permanent damage to the eyeglasses 10. In addition to preventing a rotation of the bows 18 and 20, abutment surfaces, such as abutment surfaces 52, 53, 61 and 63, may also help to distribute forces upon impacts on the eyeglasses 10, thereby preventing the pins 64 and 66 from breaking. Yet another possible function of the abutment surfaces 52, 53, 61 and 63 is to prevent the bow 20 from contacting the lens 14, thereby preventing a deterioration of the lenses.

Many variations to the eyeglasses 10 are within the scope of the invention. For example, the lenses 12 and 14 could be replaced with a single lens. In this case, the nosepiece 16 could take a different configuration or could eventually be integrated with the lens.

In addition, while the bows 18 and 20 are releasably attached to the connectors 22 and 24, thereby allowing a user to remove and replace the bows 18 and 20, it is also within the scope of the invention to have an integral bow and connector unit. In this latter configuration, the bows are not easily interchangeable by the user.

Also, the connection of the connectors 22 and 24, the nosepiece 16 and the lenses 12 and 14, as described herein above, is only an example of a way to attach these different components. The reader skilled in the art will readily appreciate that many alternative ways to attach these components are suitable. Examples of alternative ways include Nylon™ string mounts, plastic rivets and metal nut and bolts, among others.

Similarly, the configuration of the attachment of the connectors 22 and 24 to the bows 18 and 20, along with the attachment of the detachable bridge cover 80 to the nosepiece 16, are only given as examples, and many other possible implementations of these attachments are possible.

In yet another alternative, the screws 72 are inserted from a front surface of the lenses.

Although the present invention has been described hereinabove by way of preferred embodiments thereof, it can be modified, without departing from the spirit and nature of the subject invention as defined in the appended claim.

What is claimed is:

1. An eyeglass, comprising:
   a. a lens;
   b. a connector connected to said lens, said connector including an attachment section extending substantially outwardly from said lens;
   c. a bow reversibly attached to said connector, said bow including:
      i. a main segment defining a longitudinal axis;
      ii. an auxiliary segment defining an auxiliary axis extending generally inwardly towards said lens, said auxiliary segment releasably interlocking and engaging said attachment section upon a relative motion of said bow along an insertion axis, the insertion axis being angled at 45 degrees or less with respect to said longitudinal axis.

2. An eyeglass as defined in claim 1, wherein the insertion axis is angled at 20 degrees or less with respect to said longitudinal axis.

3. An eyeglass as defined in claim 2, wherein the insertion axis is substantially parallel to said longitudinal axis.

4. An eyeglass as defined in claim 2, wherein:
   a. said auxiliary segment includes a pin; and
   b. said connector includes a recess for receiving said pin; wherein
   c. said pin extends outwardly from said auxiliary segment substantially perpendicularly to the insertion axis.

5. An eyeglass as defined in claim 2, wherein
   a. said connector includes a pin; and
   b. said auxiliary segment includes a recess for receiving said pin; wherein
   c. said pin extends outwardly from said connector substantially perpendicularly to the insertion axis.

6. An eyeglass as defined in claim 5, wherein said eyeglass is a rimless eyeglass.

7. An eyeglass as defined in claim 6, wherein said recess is provided within a slot, said slot being oriented substantially parallel to the insertion axis.

8. An eyeglass as defined in claim 7, wherein said pin:
   a. adopts a first undeformed configuration when outside of said slot;
   b. deforms from the first configuration to a second deformed configuration upon being inserted into said slot; and
   c. adopts the first configuration when received by said recess.

9. An eyeglass as defined in claim 8, wherein said pin is substantially cylindrical.

10. An eyeglass as defined in claim 9, wherein said recess is substantially cylindrical.

11. An eyeglass as defined in claim 10, wherein said slot includes:
    a. a substantially rectilinear channel, said channel defining an opening for receiving said pin upon a motion of said bow along the insertion axis; and
    b. a substantially hemi-cylindrical extremity opposed to said opening.

12. An eyeglass as defined in claim 11, wherein:
    a. said recess defines a recess interior surface;
    b. said hemi-cylindrical extremity defines a substantially hemi-cylindrical end surface; and
    c. said hemi-cylindrical end surface extends continuously from said recess interior surface.

13. An eyeglass as defined in claim 12, wherein said slot includes a first bump extending inwardly within said slot between said channel and said hemi-cylindrical extremity, said first bump allowing said pin to snap into the extremity of said channel opposed to said opening.

14. An eyeglass as defined in claim 13, wherein said slot further includes a second bump extending inwardly within said slot between said channel and said hemi-cylindrical extremity, said first and second bumps facing each other within said channel.

15. An eyeglass as defined in claim 7, wherein said bow defines a cavity, said cavity
    a. including said slot and said recess; and
    b. receiving at least in part said connector.

16. An eyeglass as defined in claim 15, wherein:
    a. said pin defines a rotation axis, said rotation axis being substantially parallel to said insertion axis; and
    b. said cavity is configured and sized to allow said bow to rotate onto said pin about the rotation axis.

17. An eyeglass as defined in claim 16, wherein:
    a. said cavity defines a cavity abutment surface substantially parallel to said rotation axis, said cavity abutment surface defining a cavity abutment surface normal vector perpendicular to said cavity abutment surface, the cavity abutment surface normal vector pointing substantially inwardly towards said lens;
    b. said connector defines a connector abutment surface substantially parallel to said rotation axis, said connector abutment surface defining a connector abutment surface normal vector perpendicular to said connector abutment surface, the connector abutment surface normal vector pointing substantially outwardly from said lens; wherein
    i. said lens defines a front surface and a back surface;
    ii. said connector abutment surface and said cavity abutment surface contact each other upon a rotation of said bow around said rotation axis when an angle between said longitudinal axis and said back surface increases up to a predetermined angle.

18. An eyeglass as defined in claim 17, wherein when said connector abutment surface and said cavity abutment surface contact each other, a rotation of said bow around said rotation axis such that the angle between the longitudinal axis and the back surface increases is resisted by a contact force between said connector abutment surface and said cavity abutment surface.

19. An eyeglass as defined in claim 18, wherein said connector abutment surface and said cavity abutment surface prevent said bow and said lens from directly contacting each other upon a rotation of said bow away from said back surface.

20. An eyeglass as defined in claim 19, wherein said connector abutment surface is provided on said connector between said lens and said pin.

21. An eyeglass as defined in claim 16, wherein
 a. said eyeglass includes a fastener for attaching said connector to said lens;
 b. said connector includes an attachment bore extending therethrough, said attachment bore being substantially perpendicularly to said rotation axis, said attachment bore being for receiving said fastener.

22. An eyeglass as defined in claim 21, wherein said lens includes an attachment hole provided therein for receiving said fastener.

23. An eyeglass as defined in claim 22, wherein:
 a. said fastener includes a screw;
 b. said attachment hole is a threaded hole for threading said screw therein.

24. An eyeglass as defined in claim 23, wherein said attachment hole extends only partially through said lens.

25. An eyeglass as defined in claim 23, wherein said attachment bore in an unthreaded bore.

26. An eyeglass as defined in claim 21, wherein:
 a. said connector includes a protrusion;
 b. said lens includes a notch for receiving said protrusion; wherein
 c. said notch and said protrusion are located, configured and sized to resists a rotation of said connector about a bore axis substantially longitudinal to said bore.

27. An eyeglass as defined in claim 26, wherein said notch and said protrusion are hemicyclindrical.

28. An eyeglass as defined in claim 21, wherein said fastener pushes said connector towards said back surface.

29. An eyeglass as defined in claim 28, wherein said connector is positioned, configured and sized such that no part of said connector directly contacts said front surface.

30. An eyeglass as defined in claim 17, wherein:
 a. said connectors defines a contact surface contacting said back surface of said lens when said connector is attached to said lens, said contact surface being substantially parallel to said rotation axis;
 b. said connector defines a connection axis substantially perpendicular to said bow upon said bow being rotated at said predetermined angle; and
 c. the angle between said contact surface said connection axis is selected from a set of predetermined discrete angles.

31. An eyeglass as defined in claim 30, wherein said set of predetermined discrete angles is for adapting said connector to a curvature of said lens such as to improve a comfort experiences by an intended user wearing said eyeglass.

32. An eyeglass as defined in claim 30, wherein said set of predetermined discrete angles includes angles of about 11 degrees, 17 degrees and 22 degrees.

33. An eyeglass as defined in claim 17, wherein said connector is substantially symmetrical with respect to a symmetry plan, the symmetry plan being substantially perpendicular to the rotation axis.

34. An eyeglass as defined in claim 7, wherein:
 a. said pin is a first pin;
 b. said recess is a first recess;
 c. said connector includes a second pin; and
 d. said auxiliary segment includes a second recess for receiving said second pin.

35. An eyeglass as defined in claim 34, wherein:
 a. said slot is a first slot; and
 b. said second recess is provided within a second slot, said second slot being oriented substantially along the insertion axis.

36. An eyeglass as defined in claim 5, wherein
 a. said lens is a first lens;
 b. said eyeglass further comprises a second lens
 c. said first and second lenses are connected through a nosepeice; and
 d. said nosepiece is positioned, configured and sized for supporting said eyeglass onto a nose of an intended user.

37. An eyeglass as defined in claim 36, wherein said nosepiece includes:
 a. nose pads for receiving the nose;
 b. first and second connection portions for connecting said nosepiece respectively to said first and second lenses; and
 c. a bridge portion connected to:
  i. said first and second connection portions; and
  ii. said nose pads.

38. An eyeglass as defined in claim 37, wherein said nosepiece includes a detachable bridge cover covering at least in part said bridge portion.

39. An eyeglass as defined in claim 38, wherein:
 a. said eyeglass includes a first fastener for attaching said connector to said first lens;
 b. said connector includes a first attachment bore extending therethrough, said first attachment bore being substantially perpendicular to said rotation axis, said attachment bore being for receiving said fastener;
 c. said first lens further includes a second attachment bore;
 d. said eyeglass includes a second fastener for attaching said first connection portion to said first lens;
 e. said first connection portion includes a second attachment bore extending therethrough, said second attachment bore being for receiving said second fastener; and
 f. said first lens includes a second attachment hole provided therein for receiving said second fastener.

40. An eyeglass as defined in claim 39, wherein:
 a. said first lens includes a notch;
 b. said first connection portion includes a protrusion;
 c. said notch and said protrusion are located, configured and sized to resist a rotation of said connection portion about a second bore axis substantially longitudinal to said second bore.

41. An eyeglass as defined in claim 38, wherein:
 a. said bridge portion includes a groove; and
 b. said bridge cover includes a latch for engaging said groove to attach said bridge cover to said bridge portion.

42. An eyeglass as defined in claim 41, wherein:
 a. said groove includes a depression extending substantially inwardly into said bridge portion; and
 b. said latch includes a an extension extending substantially outwardly from said latch so as to releasably engage said depression to releasably lock said bridge cover to said bridge portion.

43. An eyeglass as defined in claim 42, wherein:
 a. said bridge portion includes a groove; and
 b. said bridge cover includes a latch for engaging said groove to attach said bridge cover to said bridge portion.

44. An eyeglass as defined in claim 43, wherein:
 a. said bridge portion includes plurality of a grooves; and
 b. said bridge cover includes plurality of latches, each latch from said plurality of latches being for engaging a respective groove from said plurality of grooves to attach said bridge cover to said bridge portion.

45. An eyeglass as defined in claim 44, wherein a. each groove from said plurality of grooves includes a respective depression extending substantially inwardly into said bridge portion;

b. each latch from said plurality of latches includes a respective extension extending substantially outwardly therefrom so as to releasably engage a respective depression from said plurality of depressions to releasably lock said bridge cover to said bridge portion.

46. An eyeglass as defined in claim 41, wherein said bridge portion, said connection portion and said nosepads are substantially transparent.

47. An eyeglass as defined in claim 44, wherein said bridge cover is colored.

48. An eyeglass as defined in claim 41, wherein said bridge portion and said first and second lenses present a substantially equivalent appearance to a human eye.

49. An eyeglass as defined in claim 48, wherein the appearance is a substantially transparent appearance.

50. An eyeglass as defined in claim 48, wherein the appearance is further colored.

51. An eyeglass as defined in claim 47, wherein a depth of each of said groove from said plurality of grooves is substantially equal to a thickness of a respective latch from said plurality of latches.

52. An eyeglass, comprising:

a. a lens;

b. a connecting means connected to said lens, said connecting means including an attachment means extending substantially outwardly from said lens;

c. a bow reversibly attached to said connecting means, said bow including:

i. a main segment means defining a longitudinal axis;

ii. an auxiliary segment means defining an auxiliary axis extending generally inwardly towards said lens, said auxiliary segment means releasably interlocking and engaging said attachment means upon a relative motion of said bow along an insertion axis, the insertion axis being angled at 45 degrees or less with respect to said longitudinal axis.

53. An eyeglass as defined in claim 52 wherein the insertion axis is substantially parallel to the longitudinal axis.

54. An eyeglass, comprising:

a. a lens;

b. a connector connected to said lens;

c. a bow reversibly attached to said connector, said bow defining a longitudinal axis; wherein d. a minimal perpendicular force required to detach said bow from said connector and exerted perpendicularly to said longitudinal axis is greater than a minimal parallel force required to detach said bow from said connector and exerted parallel to said longitudinal axis.

* * * * *